(12) United States Patent
Schiavi et al.

(10) Patent No.: US 7,918,440 B2
(45) Date of Patent: Apr. 5, 2011

(54) SUPPORT DEVICE FOR SECURING WORKPIECES

(75) Inventors: Bruno Schiavi, Piacenza (IT); Maurizio Ferrari, Pizzighettone (IT); Sandro Foletti, Piacenza (IT)

(73) Assignee: Jobs S.p.A. (IT)

( * ) Notice: Subject to any disclaimer, the term of this patent is extended or adjusted under 35 U.S.C. 154(b) by 358 days.

(21) Appl. No.: 11/443,158

(22) Filed: May 31, 2006

(65) Prior Publication Data

US 2006/0267262 A1  Nov. 30, 2006

(30) Foreign Application Priority Data

May 31, 2005 (IT) ................................ B02005A0376

(51) Int. Cl.
*B25B 11/00* (2006.01)

(52) U.S. Cl. ............ 269/21; 269/20; 269/266; 269/304; 269/45; 269/75

(58) Field of Classification Search .................... 269/20, 269/21, 266, 304, 45, 75
See application file for complete search history.

(56) References Cited

U.S. PATENT DOCUMENTS

| 3,134,208 | A | * | 5/1964 | Richmond | 451/388 |
| 4,491,306 | A | | 1/1985 | Eickhorst | |
| 5,139,245 | A | * | 8/1992 | Bruns et al. | 269/21 |
| 5,364,083 | A | * | 11/1994 | Ross et al. | 269/21 |
| 5,427,363 | A | * | 6/1995 | Rink et al. | 269/21 |
| 5,544,968 | A | * | 8/1996 | Goellner | 403/31 |
| 5,590,870 | A | * | 1/1997 | Goellner | 269/21 |
| 6,012,711 | A | * | 1/2000 | Cipolla | 269/21 |
| 6,454,333 | B2 | * | 9/2002 | Portal | 294/64.1 |

FOREIGN PATENT DOCUMENTS

| DE | 272 450 A1 | 10/1989 |
| EP | 0069230 A2 | 1/1983 |
| EP | 0507033 A1 | 10/1992 |
| EP | 0 596 189 A1 | 5/1994 |

* cited by examiner

*Primary Examiner* — Joseph J Hail, III
*Assistant Examiner* — Jamal Daniel
(74) *Attorney, Agent, or Firm* — Timothy J. Klima; Shuttleworth & Ingersoll, PLC

(57) ABSTRACT

Workpieces of large dimensions, typically body pressings or fuselage panels, are supported and secured for machining by a device capable of movement in a vertical direction and adaptable thus to the particular geometry of the workpiece. The vertical movement is produced by a rod of which the top end carries a head incorporating a pivotable fixture mechanism, equipped with a suction cup connected to a source of negative pressure by way of a suction duct and activated to clamp the work once the head is in position.

25 Claims, 7 Drawing Sheets

SUPPORT DEVICE FOR SECURING WORKPIECES

BACKGROUND OF THE INVENTION

The present invention relates to a support device for securing workpieces.

In particular, the invention relates to a device mounted on equipment designed to secure both curved and flat pieces of sheet material, typically body pressings or fuselage panels or the like, during the course of machining operations performed on these same pieces.

In sectors such as the aerospace and shipbuilding industries, machining cycles need to be carried out on pieces very often of appreciable dimensions and of curved and irregular geometry, a fact that both complicates the handling of such items considerably and causes notable difficulty in making the work secure during machining operations.

To optimize the positioning of these large items, installations typical of the prior art employ a rigid frame or gantry carrying a unit by which the work is machined. The workpiece is placed beneath the frame, and to achieve stable positioning, such installations comprise a plurality of columns, each equipped at its free top end with a support device, to which the parts for machining can be securely anchored; this ensures that machining distances are accurately maintained and that machining tools will encounter a suitably firm reaction force.

The supporting columns are capable of vertical movement, so as to adapt to the dissimilar heights that different parts of the workpiece may occupy by reason of its curved geometry.

Moreover, the curved or at all events irregular profile of the workpiece dictates also that the support devices fitted to the columns should be capable of adapting to the angle of inclination presented by the piece at the point of engagement with each device.

Conventional support devices normally comprise an aspirating element, typically a suction cup, and a ball and socket structure to which the aspirating element is mounted.

Patent EP 69230, by way of example, discloses a positioning and holding device that comprises a plenum chamber in the form of a spherical shell, surrounded uppermost by a sealing rim positioned to engage in contact with the workpiece.

During the positioning step, overpressure is generated in the hemispherical chamber of the aspirating element so that the workpiece is carried on an air cushion, and can be maneuvered while floating substantially free of frictional contact.

The spherical shell rests on a cup, likewise of essentially spherical geometry, and can be shifted through predetermined angles relative to this same cup so as to adapt to the angle of inclination of the workpiece being supported.

Numerous other solutions exist for such support devices, comprising elements that appear spherical or in any event are positionable by means of a ball joint type mechanism.

The solutions in question have proved effective to a degree, but are not without drawbacks.

A first drawback consists in the fact that chips and dust can easily be deposited on and penetrate the ball joints during the course of machining operations. This is a situation that can impede the movement of the elements making up the support devices and even cause them to seize, in extreme cases, with a self-evidently negative impact on the duration and precision of the machining operations that need to be carried out.

To the end of avoiding the drawbacks in question, and ensuring that dust and machining debris will not affect the effectiveness of the ball joints, lengthy and thorough cleaning operations must be carried out between one machining cycle and the next, or even while machining is in progress.

Another drawback connected with the use of ball joints in support devices of the type in question is that of the limited angle of maneuver afforded to the component parts of the joint, and therefore to the suction cup directly engaging the workpiece.

With this in mind, patent EP 507033, for example, discloses a device comprising a ball joint with an intermediate shell designed to increase the angle of inclination that can be accommodated.

Whilst the addition of an intermediate spherical shell represents a positive step, on the one hand, in that it provides the suction cup with increased freedom of angular movement, it serves on the other only to enlarge the areas of the joint exposed to the risk of penetration by machining debris, chips or dust as mentioned above.

Accordingly, the object of the present invention is to provide a support device for securing workpieces that will be unaffected by the drawbacks mentioned above, and moreover will be practical and effective in use.

SUMMARY OF THE INVENTION

The stated object is realized according to the present invention in a support device for securing workpieces, capable of movement vertically in a predetermined direction and adaptable thus to the shape of a workpiece.

The device disclosed comprises a rod aligned on a first center axis parallel to the predetermined direction, and a head attached to a top end of the rod, incorporating a fixture mechanism aligned on a second center axis and serving to anchor the workpiece; advantageously, the fixture mechanism is capable of angular movement about first and second axes of rotation, relative to the rod, during which one of the first and second axes of rotation remains orthogonal to the first center axis of the rod and the remaining first or second axis of rotation remains orthogonal to the second center axis of the fixture mechanism.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
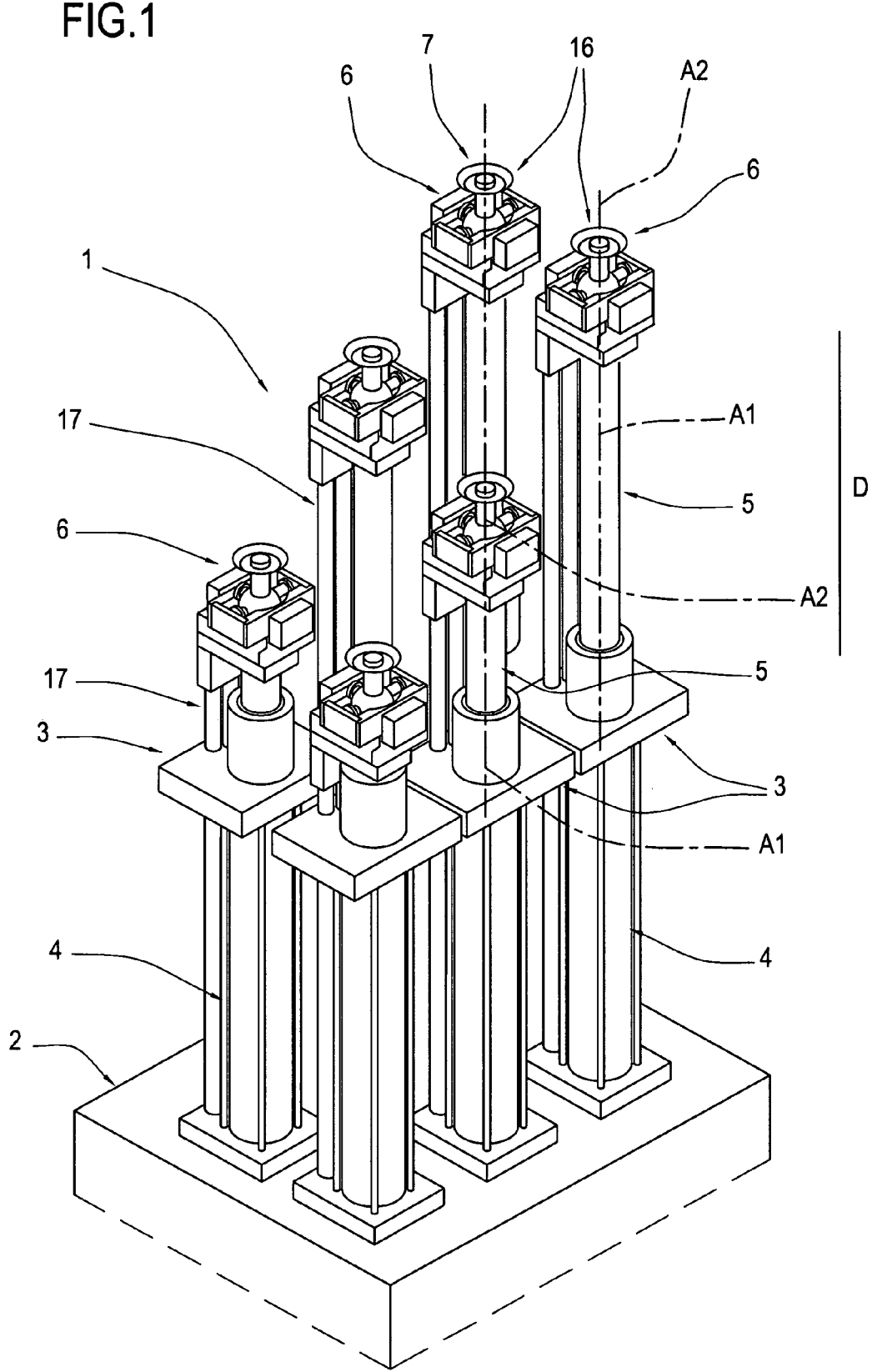
FIG. 1 shows a portion of equipment comprising a plurality of support devices according to the present invention, illustrated in perspective from above.

With reference to FIG. 1, numeral 1 denotes a portion, in its entirety, of equipment on which to support workpieces (not illustrated) for machining.

Though not illustrated, the workpieces for which the equipment 1 is ideally suited will be fashioned typically from metal or plastic sheet material.

The equipment 1 includes a bed 2 of substantially familiar embodiment, indicated fragmentarily and schematically in FIG. 1, and a plurality of devices 3 by which the aforementioned workpieces (not illustrated) are engaged.

The support devices 3 are capable of vertical movement one independently of another along a predetermined direction D, in order to adapt to the geometry of the workpieces in question, which can often present notably irregular shapes.

Each device 3 comprises a pedestal 4 connected to the bed 2, a rod 5 capable of movement relative to the pedestal 4 in the direction denoted D, and a head 6 carried by a top end of the rod 5.

The rod 5 and pedestal 4 are aligned on a first center axis A1 extending substantially parallel to the predetermined direction D.

Movement of the rod 5 relative to the pedestal 4 is induced by means of components and methods familiar to a person skilled in the art, hence neither illustrated in the drawings nor described in the course of the present specification.

Figure 2:
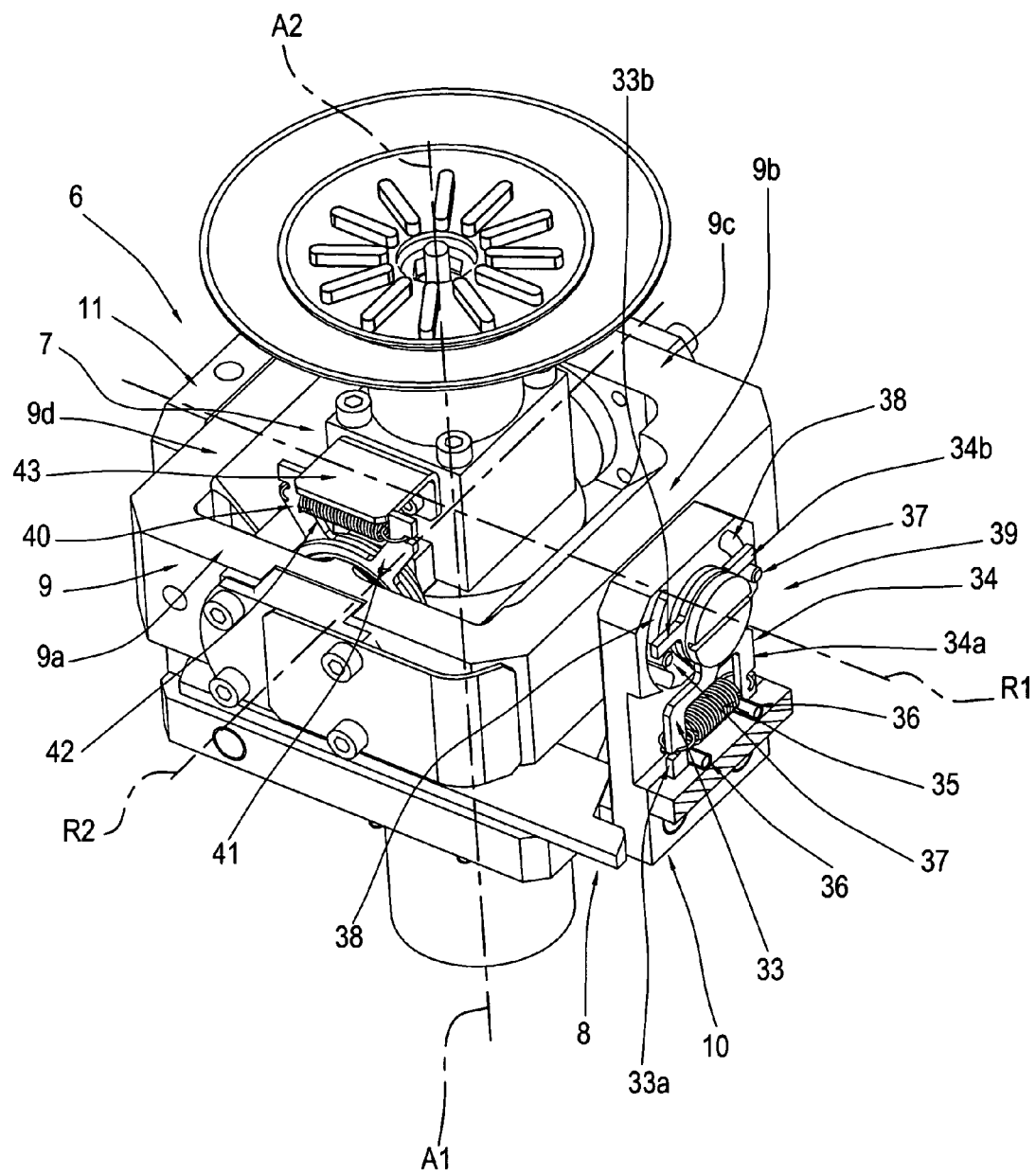
FIG. 2 shows a portion of a support device according to the present invention, illustrated in perspective from above.

Referring to FIG. 2, the head 6 supports a fixture mechanism 7 for anchoring the workpiece.

The fixture mechanism 7 is aligned on a second center axis A2.

The head 6 comprises a fixed portion 8 associated rigidly with the rod 5, and a tilting element 9 interposed between the fixed portion 8 and the fixture mechanism 7.

The tilting element 9 appears substantially as a quadrangular ring and thus presents four sides 9a, 9b, 9c and 9d of which those lying opposite one another are disposed mutually parallel and those adjoining are disposed at right angles.

The fixed portion 8 comprises two cantilevered brackets 10 and 11 extending upward parallel one with another and with the direction denoted D; the two brackets 10 and 11 are diametrically opposed on either side of the first center axis A1.

Figure 4:
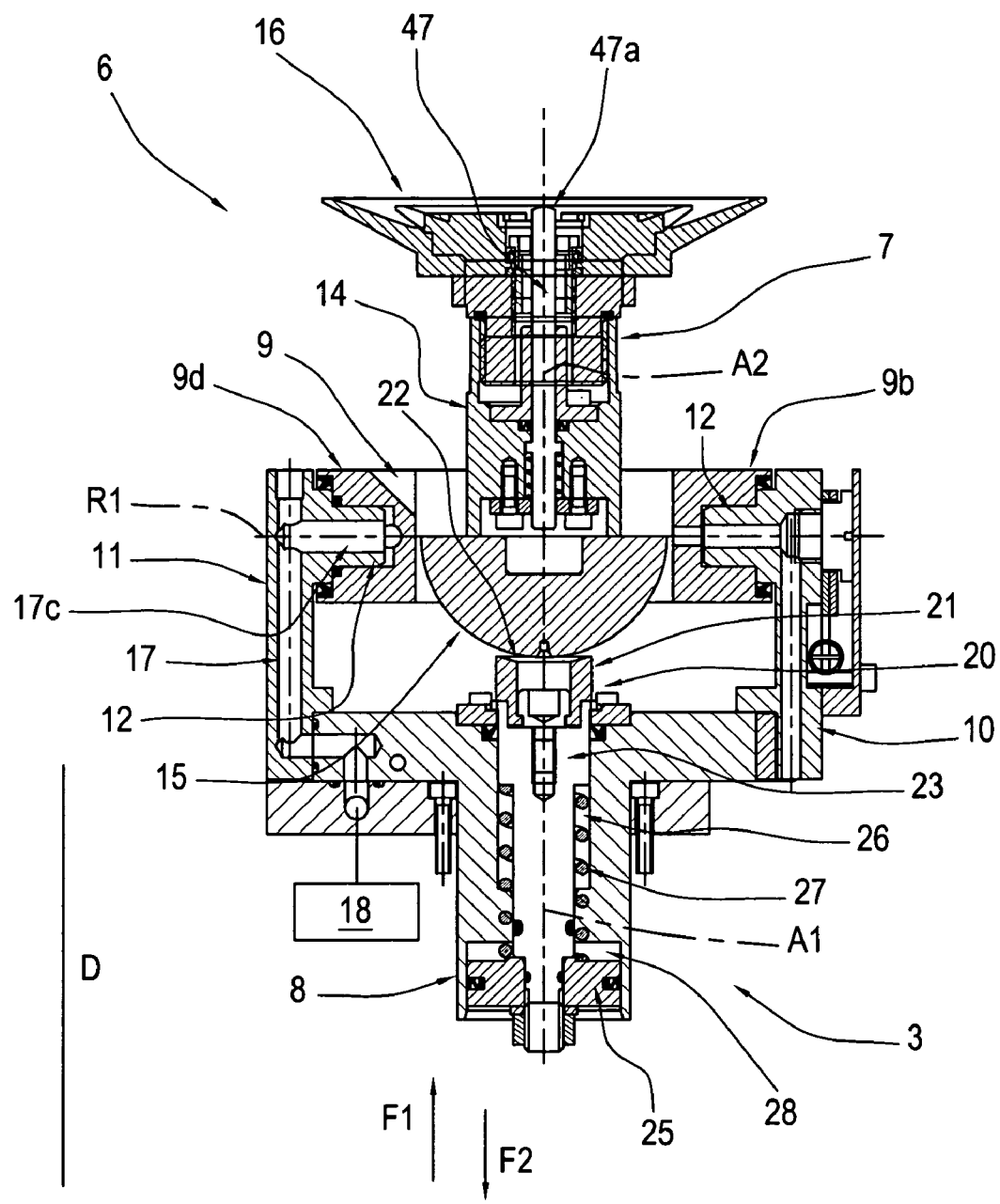
FIG. 4 is a side view of the device in FIG. 3, showing the section on IV-IV.

As illustrated in FIG. 4, the two brackets 10 and 11 of the fixed portion 8 are furnished with respective first pivots 12.

The tilting element 9 is mounted freely via the sides denoted 9b and 9d to the first pivots 12 and capable thus of angular movement, relative to the fixed portion 8, about a first axis R1 of rotation coinciding with a common fulcrum axis on which the first pivots 12 are aligned.

Figure 5:
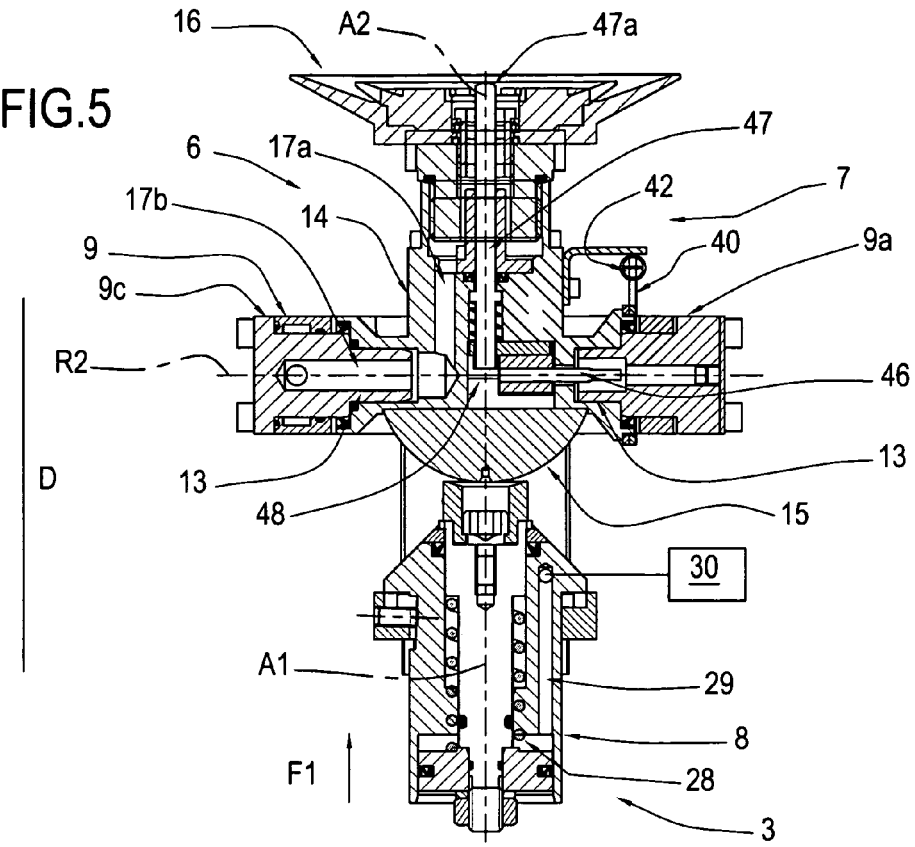
FIG. 5 is a side view of the device in FIG. 3, showing the section on V-V.

Referring to FIG. 5, it will be seen that the sides of the tilting element 9 denoted 9a and 9c are furnished with respective second pivots 13.

The fixture mechanism 7 is mounted freely to these second pivots 13 and capable thus of angular movement relative to the tilting element 9 about a second axis R2 of rotation coinciding with a common fulcrum axis on which the selfsame second pivots 13 are aligned.

With reference to FIGS. 4 and 5, the fixture mechanism 7 comprises a central body 14 engaging with the second pivots 13, a spherically contoured lower portion 15, and a suction cup 16 designed to engage in direct contact with a workpiece of the type aforementioned (not illustrated).

Also forming part of the device 3 is a suction duct 17 serving to establish a fluid connection between the suction cup 16 and a source of negative pressure represented schematically in FIG. 4 as a block, denoted 18.

The suction duct 17 comprises a first leg 17a located in the fixture mechanism 7 and connecting with the suction cup 16, a second leg 17b located in the tilting element 9, extending in part through one of the second pivots 13 and thus coaxial with the second axis R2 of rotation, and a third leg 17c located in the fixed portion 8 of the head 6. The third leg 17c of the duct 17 extends in part through one of the first pivots 12, coaxial with the first axis R1 of rotation, and in part through the bracket denoted 11.

The negative pressure source 18, suction duct 17 and suction cup 16 combine to establish means denoted 19 in their entirety, ensuring the adhesion of the fixture mechanism 7 to the workpiece (not illustrated).

As discernible in FIGS. 4 and 5, the device 3 comprises a restraining element 20 by which the fixture mechanism 7 can be immobilized relative to the first and second axes R1 and R2 of rotation. The restraining element 20 is carried slidably by the fixed portion 8 of the head 6 and comprises a hollow cylindrical portion 21 presenting a splayed rim 22 uppermost, a rod 23 coaxial with the first center axis A1, to which the cylindrical portion 21 is secured with a screw 24, and a plate 25 keyed to a bottom end of the rod 23.

A first annular chamber 26 located between the rod 23 and the fixed portion 8 provides the housing for a coil spring 27 by which the selfsame rod 23 is biased in a direction denoted F1, parallel with the aforementioned direction D.

A second annular chamber 28 located beneath the first annular chamber 26 provides a housing for the plate 25.

Referring to FIG. 5, the fixed portion 8 of the head 6 incorporates a gallery 29 through which a pressurized fluid is supplied to the second annular chamber 28.

The pressurized fluid preferably would be air, directed into the gallery 29 from a source shown schematically in FIG. 5 as a block denoted 30.

Figure 6:
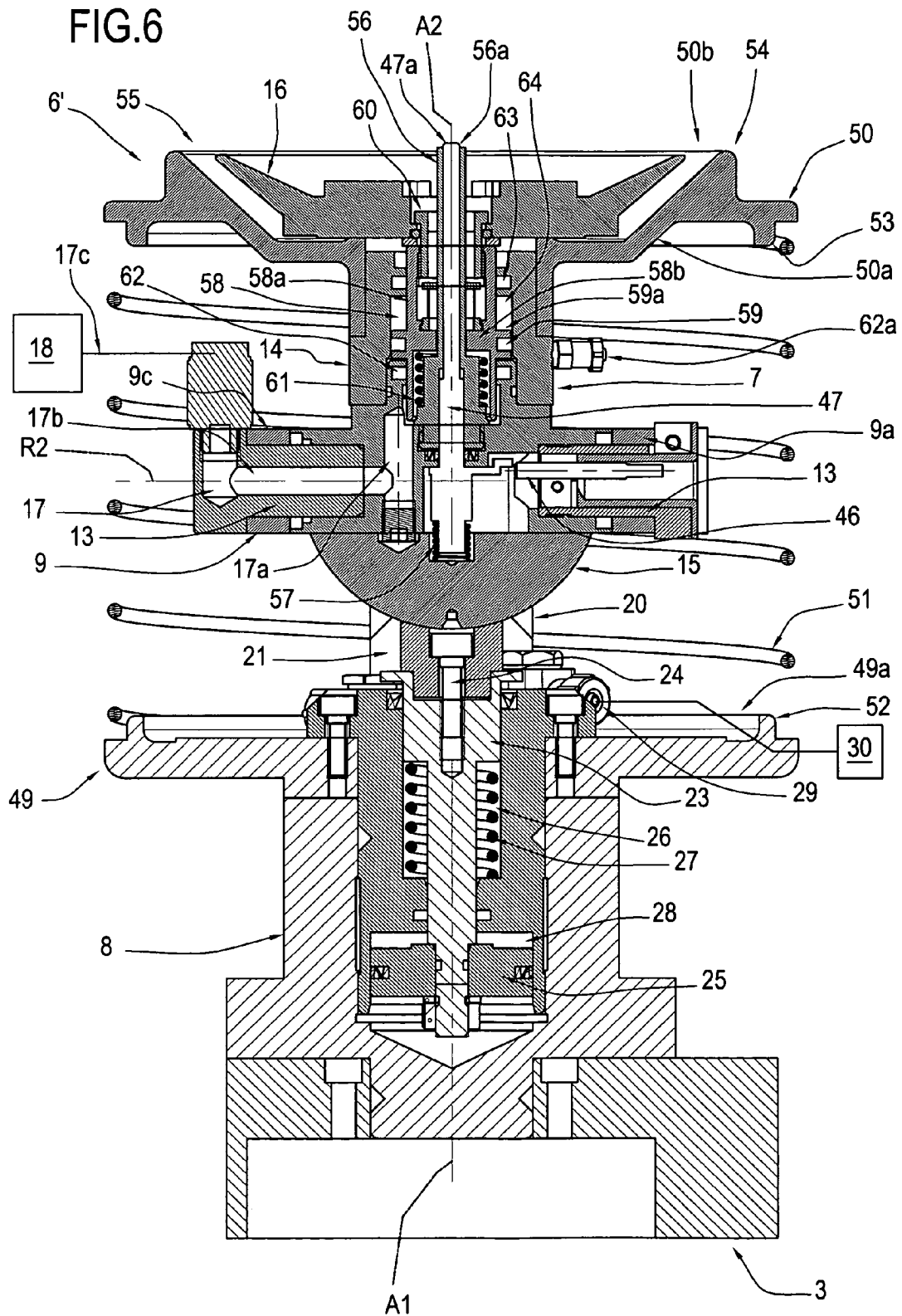
FIGS. 6 and 7 are sectional side views showing an alternative embodiment of the support device in FIGS. 2 to 5, illustrated in two different operating configurations.
Figure 7:
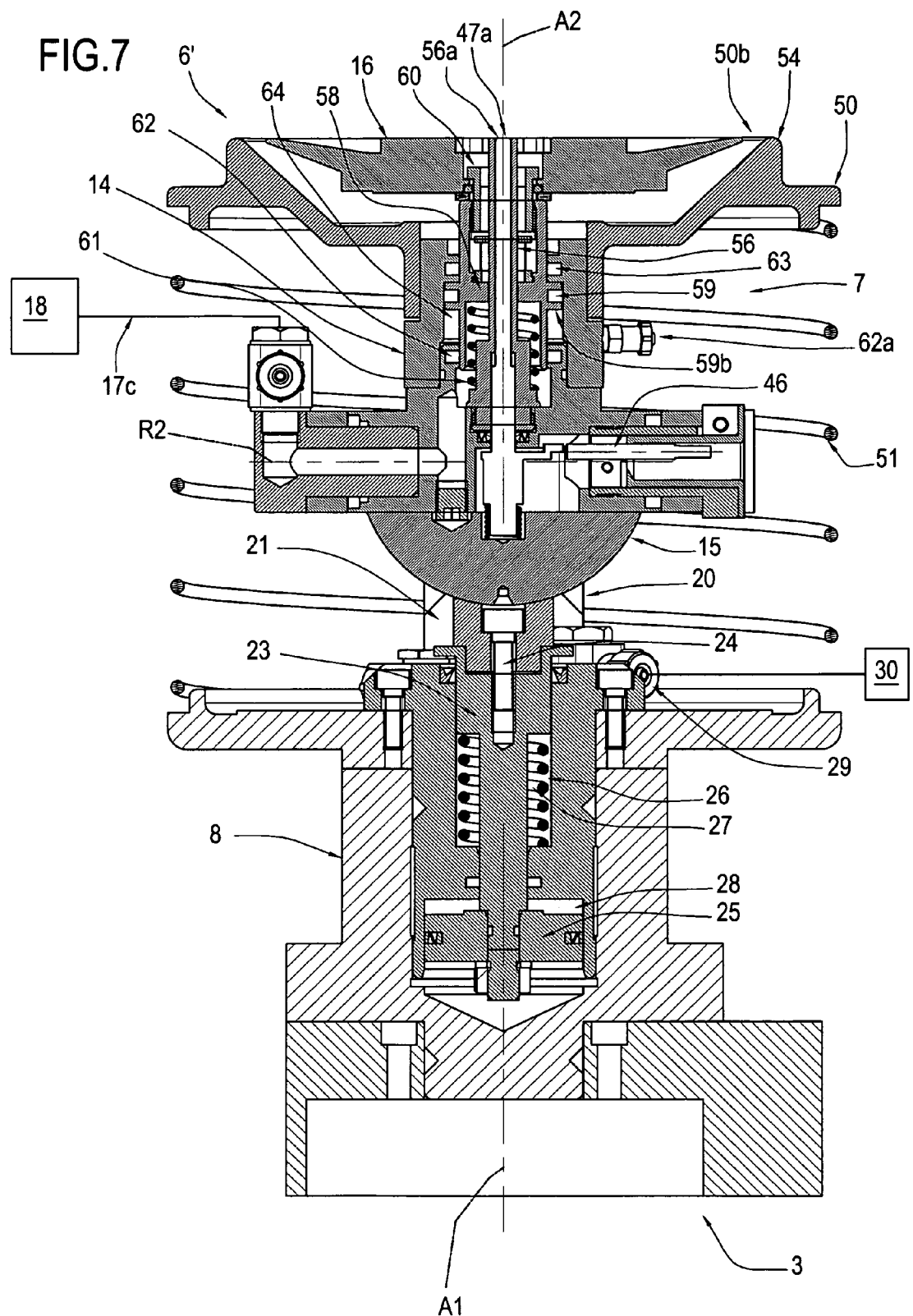

The restraining element 20 is capable of movement between a first position of engagement with the fixture mechanism 7 (as illustrated in FIGS. 6 and 7, where the head 6 is shown in an alternative embodiment denoted 6'), in which the splayed rim 22 of the hollow cylindrical portion 21 is directed forcibly against the aforementioned spherically contoured portion 15, with the result that the fixture mechanism 7 is locked and prevented from pivoting about the first and second axes R1 and R2 of rotation, and a second position of disengagement (illustrated in FIGS. 4 and 5) in which the splayed rim 22 is distanced from the spherically contoured portion 15 and the fixture mechanism 7 is free to pivot about the first and second axes R1 and R2 of rotation.

The restraining element 20 constitutes means 31 by which to immobilize the fixture mechanism 7 relative to the first and second axes R1 and R2 of rotation.

The source 30 of pressurized fluid combines with the gallery 29 and the plate 25 to establish means, denoted 32 in their entirety, by which the restraining element 20 is actuated.

As illustrated in FIGS. 2 and 4, the bracket denoted 10 carries two rocker levers 33 and 34, mounted concentrically with the first axis R1 of rotation, presenting respective lower arms 33a and 34a and upper arms 33b and 34b.

The lower arm 33a and 34a of each lever 33 and 34 is anchored to one respective end of a coil spring denoted 35.

A limit position of minimum distance between the two lower arms 33a and 34a is established by two stop elements 36 fixed to the bracket 10.

The upper arm 33b and 34b of each lever 33 and 34, on the other hand, is placed so as to locate against a respective pin 37 projecting from the corresponding side 9b of the tilting element 9.

Each pin 37 occupies a relative clearance slot 38 of curved outline afforded by the bracket 10.

The coil spring 35, rocker levers 33 and 34 and pins 37 combine to provide the device 3 with first spring means 39 opposing the angular movement of the tilting element 9 about the first axis R1 of rotation.

The purpose of the first spring means 39 is to hold the tilting element 9 in a stable state of balance relative to the first axis R1 of rotation. In other words, when the tilting element 9 is not subject to the action of external forces, the first spring means 39 will ensure that the second axis R2 of rotation stays substantially orthogonal to the first center axis A1 of the rod 5.

As illustrated in FIGS. 2 and 5, the tilting element 9 carries two levers 40 and 41 pivotable on a common fulcrum coinciding with the second axis R2 of rotation.

The two levers 40 and 41 are anchored each to one respective end of a coil spring 42, and positioned to locate against opposite corner edges of a fixed plate 43 cantilevered from the central body 14 of the fixture mechanism 7.

When in contact with the levers 40 and 41, the plate 43 establishes a limit position of minimum distance between the selfsame levers 40 and 41.

The coil spring 42, levers 40 and 41 and plate 43 combine thus to provide second spring means 44 opposing the angular movement of the fixture mechanism 7 about the second axis R2 of rotation.

The purpose of the second spring means 44 is to hold the fixture mechanism 7 in a stable state of balance relative to the second axis R2 of rotation. In other words, when the fixture mechanism 7 is not subject to the action of external forces, for example as when in contact with a workpiece, the second spring means 44 will ensure that the second center axis A2 of the fixture mechanism 7 stays substantially orthogonal to the first axis R1 of rotation.

The coil spring 27 occupying the first annular chamber 26 provides third spring means 45 opposing the action of the actuating means 32.

With reference to FIG. 5, the device 3 further comprises a presence sensor 46 such as will detect the shift of a plunger 47 mounted slidably and flexibly within the central body 14 of the fixture mechanism 7, and extending longitudinally in the direction denoted D.

A top end 47a of the plunger 47 emerges into the suction cup 16 and is positioned thus to engage in contact with a workpiece, so that the presence of the workpiece can be signaled to the sensor 46 by a sliding movement of the plunger.

The sensor 46 is connected to a monitoring and control unit substantially of conventional type, which is neither illustrated in the drawings nor described in the course of the specification.

In combination with the plunger 47, the sensor 46 provides the device 3 with means 48 by which to detect the proximity of the fixture mechanism 7 to the workpiece (not illustrated).

Figure 8:
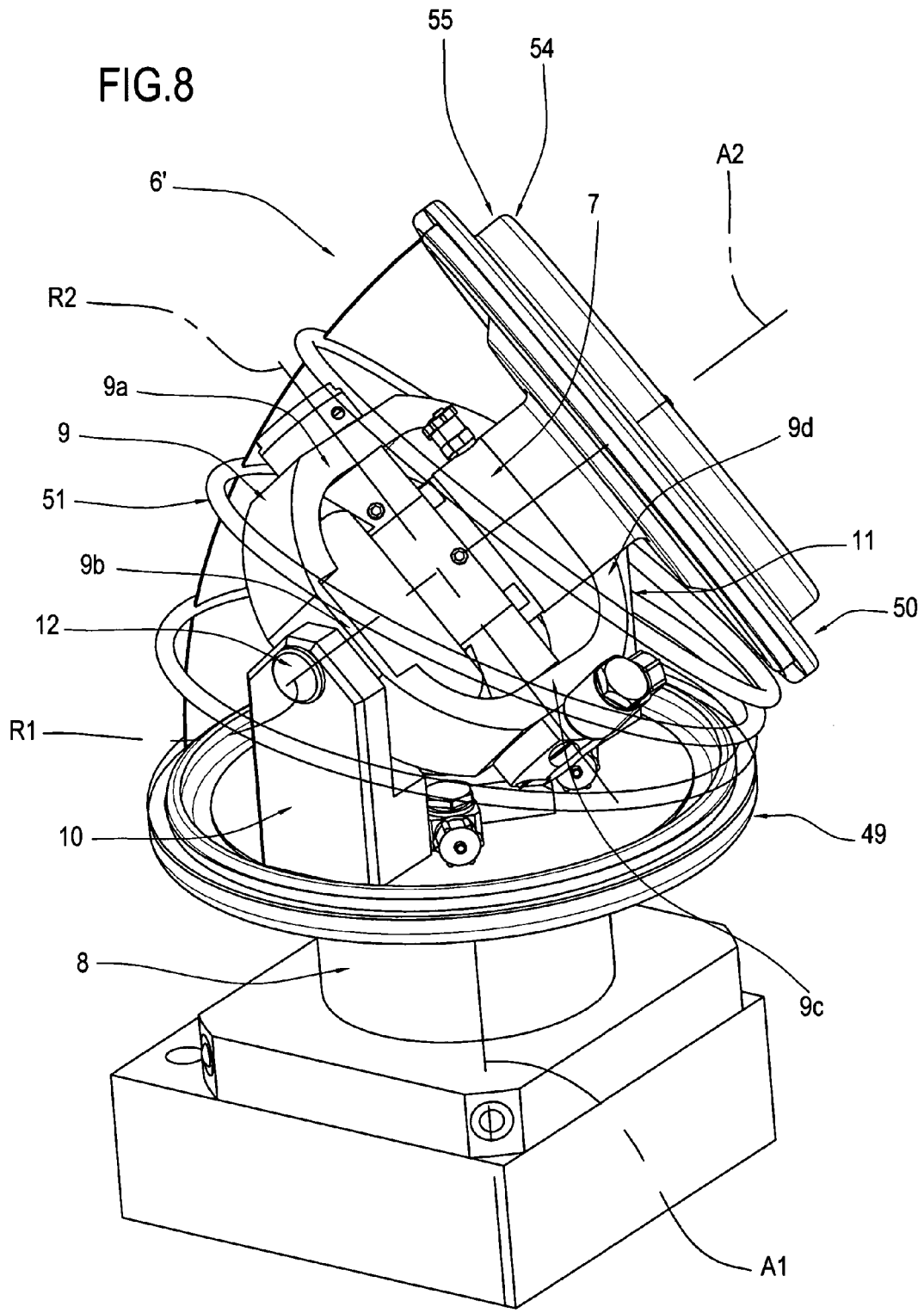
FIG. 8 shows the device of FIGS. 6 and 7, illustrated in perspective from above and occupying a different configuration in space.

FIGS. 6 to 8 illustrate a different embodiment of the head 6 according to the present invention.

Whilst the head of FIGS. 6, 7 and 8 is denoted by the numeral 6', in its entirety, the component parts corresponding and similar to those already described above are denoted in FIGS. 6, 7 and 8 using the same numbers as in FIGS. 2 to 5.

Like the head 6 first described, this head 6' also carries a fixture mechanism 7 for anchoring a workpiece.

The fixture mechanism 7 is aligned on a second center axis A2.

The head 6' further comprises a fixed portion 8 associated rigidly with the rod 5, and a tilting element 9 interposed between the fixed portion 8 and the fixture mechanism 7.

In the example of FIG. 8, the tilting element 9 appears substantially as a quadrangular ring and thus presents four sides 9a, 9b, 9c and 9d of which those lying opposite one another are disposed mutually parallel and those adjoining are disposed at right angles. Each two adjoining sides 9a, 9b, 9c and 9d are interconnected by a respective curved segment.

The fixed portion 8 comprises two cantilevered brackets 10 and 11 extending upward parallel one with another and with the direction denoted D; the two brackets 10 and 11 are diametrically opposed on either side of the first center axis A1.

As discernible from FIG. 8, the two brackets 10 and 11 of the fixed portion 8 are furnished with respective first pivots 12, of which one only is visible in the drawing.

The tilting element 9 is mounted freely via the sides denoted 9b and 9d to the first pivots 12 and capable thus of angular movement, relative to the fixed portion 8, about a first axis R1 of rotation coinciding with a common fulcrum axis on which the first pivots 12 are aligned.

Referring to FIG. 6, it will be seen that the sides of the tilting element 9 denoted 9a and 9c are furnished with respective second pivots 13.

The fixture mechanism 7 is mounted freely to these second pivots 13 and capable thus of angular movement relative to the tilting element 9 about a second axis R2 of rotation coinciding with a common fulcrum axis on which the selfsame second pivots 13 are aligned. The fixture mechanism 7 comprises a central body 14 engaging with the second pivots 13, a spherically contoured lower portion 15, and a suction cup 16 designed to engage in direct contact with a workpiece (not illustrated).

As illustrated in FIGS. 6 and 7, the head 6' also comprises a first or bottom flange 49, and a second or top flange 50 of cupped appearance.

The bottom first flange 49 is circular in shape, rigidly associated with the fixed portion 8 of the head 6' and aligned concentrically on the first center axis A1.

The top second flange 50, likewise circular, is carried by the central body 14 of the fixture mechanism 7 and aligned concentrically on the second center axis A2.

Interposed between the two flanges 49 and 50 is a coil spring denoted 51.

The two endmost coils of the spring 51 are seated against annular projections 52 and 53 afforded by respective inner faces 49a and 50a of the first flange 49 and the second flange 50.

To advantage, the coil spring 51 can be shielded by a convoluted cylindrical boot of familiar type (not illustrated), connecting the two flanges 49 and 50 flexibly and ensuring optimum mobility of the one relative to the other while preventing dust or chips from penetrating and fouling the head 6'.

The cupped second flange 50 also presents a top outer face 50b of concave appearance, delimited by an annular rim 54 aligned concentrically on the second center axis A2.

With its concave face and annular rim 54, the second flange 50 thus provides a guard element 55 serving to protect the suction cup 16.

In like manner to the first and second spring means 39 and 44 of the head 6 described previously, the coil spring denoted 51 serves to maintain the fixture mechanism 7 in a stable state of balance relative to the second axis R2 of rotation, and the tilting element 9 in a stable state of balance relative to the first axis R1 of rotation. In other words, when the fixture mechanism 7 and the tilting element 9 are not subject to the action of external forces, such as those generated by contact with a workpiece, the coil spring 51 will ensure that the second center axis A2 of the fixture mechanism 7 remains substantially in alignment with the first center axis A1 of the rod 5.

Likewise in this second embodiment, the device 3 comprises a suction duct 17 establishing a fluid connection between the suction cup 16 and a source of negative pressure, represented schematically in FIG. 6 as a block denoted 18.

The suction duct 17 comprises a first leg 17a located in the fixture mechanism 7 and connecting with the suction cup 16, a second leg 17b located in the tilting element 9, extending in part through of the second pivots 13 and thus coaxial with the second axis R2 of rotation, and a third leg 17c connected with the negative pressure source 18.

The negative pressure source 18, suction duct 17 and suction cup 16 combine to establish means denoted 19 in their entirety, ensuring the adhesion of the fixture mechanism 7 to a workpiece (not illustrated).

Similarly to the head 6 first described, this second head 6' comprises a restraining element 20 by which the fixture mechanism 7 can be immobilized relative to the first and second axes R1 and R2 of rotation. Since the restraining element 20 of the second head 6' is substantially identical to that of the head 6 first described, reference can be made to the earlier part of the specification for a detailed description of the component parts.

The device 3 comprises a presence sensor 46, illustrated in FIG. 6, such as will detect the shift of a plunger 47 extending longitudinally in the direction denoted D, mounted slidably within a cylindrical tube 56 and cushioned flexibly by a spring 57 seated in a housing afforded by the spherically contoured lower portion 15.

The tube 56 slidably housing the plunger 47 is rigidly associated with the central body 14 and presents a top end 56a providing the device 3 with a fixed point of reference from which to calculate positioning distances, when securing the workpiece, and possibly machining distances thereafter.

As concerning the operation of the plunger 47, reference can be made to the foregoing description of the head 6 illustrated in FIGS. 2 to 5.

The central body 14 houses a piston 58, slidable relative to the selfsame body 14 along the center axis A2 of the fixture mechanism 7.

The piston 58 consists essentially in a hollow cylindrical body 58a, an internal web 58b affording a square hole (not illustrated) occupied slidably by the aforementioned cylindrical tube 56, and an annular yoke 59 consisting of two walls 59a and 59b, respectively upper and lower. The walls 59a and 59b are visible respectively in FIG. 6 and in FIG. 7.

The piston 58 is connected rigidly to the suction cup 16 by means of a threaded sleeve 60.

The internal web 58b of the piston 58 is engaged from beneath by a compression spring 61 serving to bias the piston 58 away from the lower portion 15 of the fixture mechanism 7.

The compression spring 61 is coiled partially about a base portion of the tube 56.

Numeral 62 denotes a first annular air plenum located in a top part of the lower portion 15, at its connection with the central body 14, into which compressed air is directed through a duct 62a shown only fragmentarily in FIGS. 6 and 7.

A second annular air plenum 63, afforded in turn by the central body 14, is filled with compressed air from a relative duct not shown in the drawings.

Still in FIGS. 6 and 7, numeral 64 denotes an air chamber located between the piston 58, the central body 14 and the two annular plenums 62 and 63, into which compressed air is directed from the two plenums 62 and 63 through respective openings, not illustrated, afforded by the selfsame plenums.

Referring again to the suction duct 17, the fluid connection between the first leg 17a of the duct and the suction cup 16 occurs through the inside of the piston 58, and in particular exploiting the square outline of the hole, not illustrated, in the web 58b of the piston 58.

In other words, the tube 56 being of cylindrical geometry and therefore circular outline, its outer circumference is inscribed within the quadrangular perimeter of the square presented by the hole (not illustrated): thus, the difference between the area of the square and the area of the circle delimited by the circumference of the tube creates a passage that forms part of the suction duct.

In operation, referring to FIG. 1, a workpiece of the type aforementioned (not illustrated) is positioned on the equipment 1 and the various support devices 3 are activated, in substantially familiar manner, with the rod 5 of each one being adjusted along the direction D to a predetermined height such as will allow a respective portion of the workpiece to be properly supported.

The steps involved in positioning the devices 3, as outlined previously, are substantially familiar and will not therefore be described further in any significant detail.

Advantageously, the positioning steps are carried out with the aid of the aforementioned presence sensor 46, adopting conventional procedures that are not described further.

For the suction cup 16 to establish a secure grip on the workpiece, it must be offered substantially parallel to the surface of the work at the point of contact. In other words, the second axis A2 of the fixture mechanism 7 must be set perpendicularly to the aforementioned surface of the work.

Accordingly, correct positioning of the suction cup 16 and therefore of the fixture mechanism 7 is obtained by causing the selfsame component to pivot on the second axis R2 of rotation and causing the tilting element 9 to pivot on the first axis R1 of rotation.

The correct positioning in question will occur automatically when positive contact is made between the suction cup 16, or the cupped second flange 50, and the surface of the workpiece, but can also be expedited manually by an operator as and when appropriate.

Once the requisite positioning of the workpiece and the fixture mechanism 7 one relative to another has been achieved, the suction duct 17 is opened so as to connect the suction cup 16 to the source of negative pressure 18.

The depression now created in the space between the suction cup 16 and the surface of the workpiece will cause the fixture mechanism 7 to lock onto the workpiece, in conventional manner.

With reference to the head denoted 6' and to the illustration of FIG. 7, correct positioning of the head 6' is followed by the step of feeding compressed air into the first air plenum 62, from which the air will then be directed by way of the aforementioned openings (not illustrated), onto the bottom wall 59b presented by the annular yoke 59 of the piston 58.

The force created by the action of compressed air on the wall 59b combines with the mechanical force of the compression spring 61 to lift the piston 58 and the rigidly coupled suction cup 16, producing the configuration of FIG. 7, that is to say with the suction cup 16 offered in full frontal contact to the workpiece (not illustrated).

With this upward movement of the suction cup 16 on the line of the second center axis A2, the top second flange 50 is left free to translate upward a short distance, displaced by the action of the coil spring 51.

This translational movement enables the annular rim 54 of the top second flange 50 to reach the plane of reference established by the top end 56a of the tube 56. In other words, when the suction cup 16 is raised and no longer retaining the second flange 50 in contact with the central body 14, the flange 50 is thrust substantially into contact with the surface of the work by the coil spring 51.

As illustrated in FIG. 7, the reference plane coincides substantially with the surface of the workpiece (not illustrated), and accordingly, the fact that both the suction cup 16 and the rim 54 of the cupped second flange 50 are positioned at the same height is instrumental, during operation, in ensuring that the area immediately around the suction cup 16 remains protected against the penetration of dust, chips and machining debris, and that the cup itself is prevented advantageously from becoming worn and damaged.

Once all of the devices 3 needed to secure the workpiece are in the active condition described above, the workpiece can be machined.

When machining operations have been completed, a pressure level at least equal to atmospheric will be re-established at the suction cup 16, whereupon the fixture mechanisms 7 can be detached from the surface of the workpiece and the workpiece removed from the equipment 1.

In the case of the head 6' shown in FIG. 6, the steps in question are accomplished by charging the second plenum 63 with compressed air, which then passes through the aforementioned openings (not illustrated) and is directed onto the top wall 59a presented by the annular yoke 59 of the piston 58.

The force generated by pneumatic pressure on the wall 59a overcomes the force of the spring 61, lowering the piston 58 and the rigidly coupled suction cup 16 to bring about the configuration illustrated in FIG. 6, that is to say with the suction cup 16 registering against the top outer face 50b of the second flange 50 and the flange 50 itself located against the central body 14.

Once the workpiece has been released, the fixture mechanism 7 of each device 3 is no longer subject to any external action, other than a possible corrective action of the two coil springs 35 and 42, in the case of the first head 6, or the one coil spring 51 in the case of the second head 6'.

The springs 35, 42 and 51 in question will come into operation whenever the second center axis A2 of the fixture mechanism 7 shifts away from a position of coaxial alignment with the first center axis A1 of the rod 5.

Figure 3:
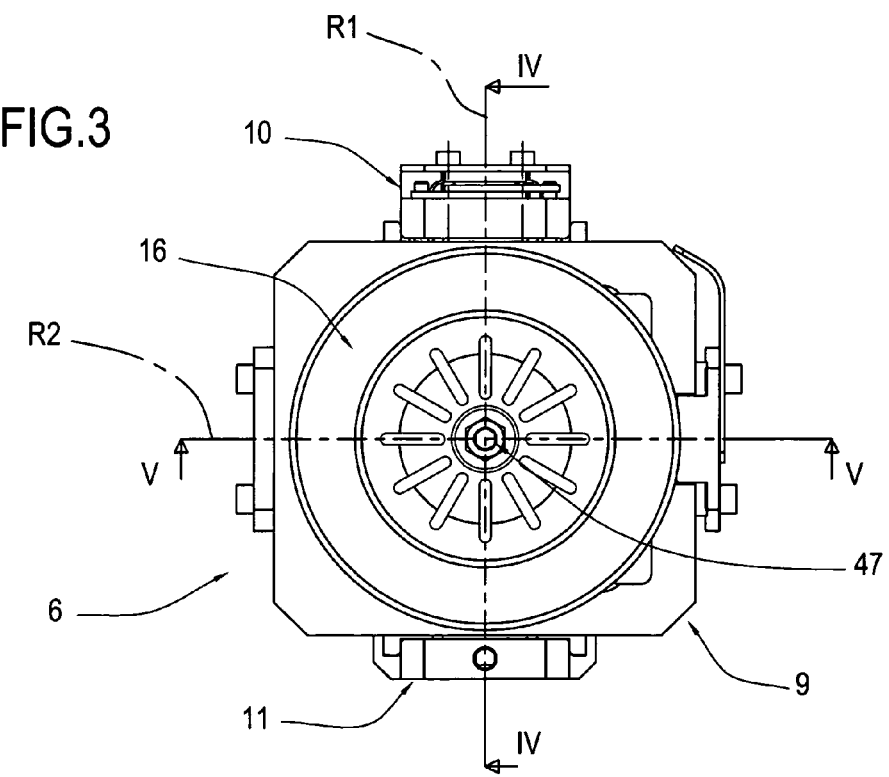
FIG. 3 shows the device of FIG. 2 from above, in a schematic plan view.

Referring to FIG. 2, any angular movement of the tilting element 9 about the relative axis R1 of rotation will cause one of the two pins 37 to engage with one of the upper arms 33b and 34b of the rocker levers 33 and 34, with the result that the lever 33 or 34 rotates about the axis R1. In the example of FIG. 3, the one rocker lever 33 pivots clockwise about the axis R1 of rotation, whilst the other lever 34 pivots counterclockwise.

If, for example, the tilting element 9 is caused to pivot clockwise about its axis R1, the pin 37 engaging the upper arm denoted 33b will have produced a corresponding clockwise rotation of the lever 33, and correspondingly, the lower arm 33a of this same lever will have extended and loaded the coil spring 35.

When the force inducing angular movement of the tilting element 9 has been removed, the reaction force of the loaded spring 35, tensioned by the rocker lever 33 and the pin 37, will duly return the tilting element 9 to a state of balance with the second axis R2 of rotation substantially orthogonal to the first center axis A1.

In like manner to the coil spring denoted 35, the spring denoted 42 will cause the levers 40 and 41 to bring the fixture mechanism 7, after pivoting on the second axis R2, into a state of balance with the second center axis A2 substantially orthogonal to the first axis R1 of rotation.

The configuration of the fixture mechanism 7 as illustrated in FIG. 2 is therefore one of stable balance, given that when shifted one way or the other, the component 7 will tend always to reassume this same configuration.

Conversely, the configuration of the fixture mechanism 7 in the case of the head 6' illustrated in FIG. 8, assuming there are external forces tending to maintain the component in the position depicted, is describable as one of instability, given that when the external forces are removed, the coil spring 51 will cause the component 7 to move away from this configuration and return to a condition in which the two axes A1 and A2 are substantially aligned.

The movements of the fixture mechanism 7 relative to the two axes R1 and R2 of rotation have been described thus far without reference to the action of the immobilizing means 31, now to be described.

To reiterate, FIGS. 4 and 5 illustrate the restraining element 20 in the aforementioned second position of disengagement, that is to say with the fixture mechanism 7 free to pivot on the first and second axes R1 and R2 of rotation.

The position of disengagement is brought about pneumatically, as the result of compressed air being directed into the second annular chamber 28 and acting on the plate 25.

In other words, the pressure of the air impinging on the top surface of the plate 25 produces a force acting in the direction of the arrow denoted F2 and able to overcome the force of the coil spring 27 acting in the direction of the arrow denoted F1.

To immobilize the fixture mechanism 7 in a given position, the restraining element 20 must be moved into the first position of engagement (illustrated in FIGS. 6 and 7), with the splayed top rim 22 of the hollow cylindrical portion 21 directed forcibly against the spherically contoured portion 15. The restraining element 20 is moved from the second position to the first position simply by shutting off the flow of compressed air into the annular chamber 28, or at any rate by restoring a level of pressure in the chamber 28 insufficient to oppose the mechanical force of the spring 27.

To advantage, accordingly, an unexpected loss of pneumatic pressure to the head 6 or 6' caused by an equipment breakdown or malfunction will not result in a displacement of the fixture mechanism 7, since the position of the component is maintained by the force of the coil spring 27, with compressed air used only to disengage the restraining element 20.

As regards the positioning of the device relative to the workpiece, in the case of the alternative embodiment of the head 6' according to the present invention, this is facilitated by the inclusion of the guard element 55 which, being fashioned from a rigid material, serves both to protect the suction cup 16 from unintended impact with the workpiece, and to bolster the interface between the workpiece and the pivotable parts of the device, so that the desired position of engagement with the workpiece is achieved with greater speed and precision.

Without the guard element 55, in practice, the suction cup 16 would be offered to the workpiece directly, and this could introduce a delay factor into the movements of pivotable parts due to the elastically deformable nature of the cup 16.

Advantageously, any such drawback is precluded by the adoption of a guard element 55 in the form of the cupped second flange 50.

Thus, the second flange 50 serves to protect the suction cup 16 both during the step of positioning the head 6' against the workpiece, and after the work has been secured, or more exactly, guarding initially against impact and rubbing contact that could degrade a deformable material with a high coefficient of friction, and thereafter, preventing exposure of the suction cup 16 to machining chips and dust.

The effectiveness of movement obtainable with the device according to the invention is advantageously greater than that of a conventional ball joint, and achieved without any risk of component parts being degraded by the penetration of machining debris, also without the need for fixture heads to undergo frequent and thorough cleaning operations.

What is claimed is:

1. A support device for securing workpieces, capable of movement vertically in a predetermined direction and adaptable thus to a shape of a workpiece, comprising:
   a rod having a first center axis extending parallel to the predetermined direction;
   a head attached to a top end of the rod and incorporating a fixture mechanism serving to anchor the workpiece,
   said fixture mechanism having a second center axis and being capable of angular movement relative to the rod about first and second axes of rotation, during which one of the first and second axes of rotation remains orthogonal to the first center axis of the rod and the remaining of the first and second axes of rotation remains orthogonal to the second center axis of the fixture mechanism,
   the head further comprising a fixed portion attached to the rod and positionally fixed with respect to the rod, and a tilting element interposed between the fixed portion of the head and the fixture mechanism, the tilting element being mounted pivotally to the fixed portion of the head for angular movement about the first axis of rotation, the fixture mechanism being mounted pivotably to the tilting element for angular movement about the second axis of rotation; each of the tilting element and the fixture mechanism angularly movable to adjust an orientation of the fixture mechanism to correspond to a facing portion of the workpiece,
   the device further comprising a first spring mechanism opposing an angular movement of the tilting element about the first axis of rotation; wherein the first spring mechanism is operably positioned between the fixed portion and the tilting element, the first spring mechanism comprising:
   first and second rocker levers each pivotally mounted about the first axis of rotation, each of the first and second rocker levers having an extending first arm and an extending second arm;
   a spring element connected between the first arms of the first and second rocker levers to exert a force biasing the first and second rocker levers in opposite rotational directions about the first axis of rotation;
   first and second stop elements attached to the fixed portion for respectively engaging the first arms of the first and second rocker levers to oppose the biasing force of the spring element and limit an amount of rotation of each of the first and second rocker levers;
   first and second engagement members attached to the tilting element for respectively engaging the second arms of the first and second rocker levers, such that in a clockwise rotation of the tilting element about the first axis of rotation, the engagement of the first engagement member with the second arm of the first rocker lever causes the first rocker lever to rotate in a clockwise rotation about the first axis of rotation with the spring element opposing such movement of the first rocker lever, first engagement member and the tilting element, and in a counterclockwise rotation of the tilting element about the first axis of rotation, the engagement of the second engagement member with the second arm of the second rocker lever causes the second rocker lever to rotate in a counterclockwise rotation about the first axis of rotation with the spring element opposing such movement of the second rocker lever, second engagement member and the tilting element;
   the first spring mechanism thereby causing the second axis of rotation to remains substantially orthogonal to the first center axis of the rod when the tilting element is not subject to an action of external forces.

2. A device as in claim 1, wherein the first and second axes of rotation are mutually orthogonal.

3. A device as in claim 1, wherein the tilting element is mounted pivotably to the fixed portion of the head and capable thus of angular movement about the first axis of rotation.

4. A device as in claim 1, further comprising a spring mechanism opposing the angular movement of the fixture mechanism about the second axis of rotation.

5. A device as in claim 1, comprising a detector mechanism for detecting a proximity of the workpiece to the fixture mechanism.

6. A device as in claim 5, wherein the detector mechanism comprises at least one presence sensor mounted to the fixture mechanism for indicating the close proximity of the workpiece to the fixture mechanism.

7. Equipment for supporting workpieces, comprising at least one of sheet metal and plastic material and comprising a plurality of support devices as in claim 1.

8. A device as in claim 1, and further comprising two separate cylindrically shaped pivots positioned on opposite sides of the fixed portion on a common axis and engaging corresponding sides of the tilting element to form the first axis of rotation.

9. A device as in claim 1, and further comprising two separate cylindrically shaped pivots positioned on opposite sides of the tilting element on a common axis and engaging corresponding sides of the fixture mechanism to form the second axis of rotation.

10. A device as in claim 1, wherein the first and second engagement members project from the tilting member in a direction parallel to the first axis of rotation and the first spring mechanism further comprises a first bracket attached to the fixed portion which rotationally supports the tilting element and the rocker levers, the stop members being attached to the first bracket, the bracket having first and second curved clearance slots through which the first and second engagement members projecting from the tilting element pass through to engage the second arms of the first and second rocker levers, respectively, the clearance slots providing a limited range of rotation of the respective engagement members, and thus, the tilting element.

11. A support device for securing workpieces, capable of movement vertically in a predetermined direction and adaptable thus to the shape of a workpiece, comprising:
   a rod having a first center axis extending parallel to the predetermined direction;
   a head attached to a top end of the rod and incorporating a fixture mechanism serving to anchor the workpiece;
   said fixture mechanism having a second center axis and being capable of angular movement relative to the rod about first and second axes of rotation, during which one of the first and second axes of rotation remains orthogonal to the first center axis of the rod and the remaining of the first and second axes of rotation remains orthogonal to the second center axis of the fixture mechanism;
   the support device comprising a guard mechanism protecting a suction cup, the guard mechanism comprising a cupped flange carried by the fixture mechanism and slidable relative to the fixture mechanism along the center axis of the fixture mechanism.

12. A device as in claim 11, wherein the cupped flange includes an annular rim for engaging the workpiece.

13. A support device for securing workpieces, capable of movement vertically in a predetermined direction and adaptable thus to a shape of a workpiece, comprising:
a rod having a first center axis extending parallel to the predetermined direction;
a head attached to a top end of the rod and incorporating a fixture mechanism serving to anchor the workpiece;
said fixture mechanism having a second center axis and being capable of angular movement relative to the rod about first and second axes of rotation, during which one of the first and second axes of rotation remains orthogonal to the first center axis of the rod and the remaining of the first and second axes of rotation remains orthogonal to the second center axis of the fixture mechanism;
the head further comprising a fixed portion attached to the rod and positionally fixed with respect to the rod, and a tilting element interposed between the fixed portion of the head and the fixture mechanism, the tilting element being mounted pivotably to the fixed portion of the head for angular movement about the first axis of rotation, the fixture mechanism being mounted pivotably to the tilting element for angular movement about the second axis of rotation; each of the tilting element and the fixture mechanism angularly movable to adjust an orientation of the fixture mechanism to correspond to a facing portion of the workpiece,
the device further comprising a second spring mechanism opposing the angular movement of the fixture mechanism about the second axis of rotation; wherein the second spring mechanism is operably positioned between the fixture mechanism and the tilting element, the second spring mechanism comprising:
first and second rocker levers each pivotally mounted about the second axis of rotation, each of the first and second rocker levers having an extending first arm and an extending second arm;
a spring element connected between the first arms of the first and second rocker levers to exert a force biasing the first and second rocker levers in opposite rotational directions about the second axis of rotation;
first and second stop elements attached to the tilting element for respectively engaging the second arms of the first and second rocker levers to oppose the biasing force of the spring element and limit an amount of rotation of each of the first and second rocker levers;
first and second engagement members attached to the fixture mechanism for respectively engaging the first arms of the first and second rocker levers, such that in a clockwise rotation of the fixture mechanism about the second axis of rotation, the engagement of the first engagement member with the first arm of the first rocker lever causes the first rocker lever to rotate in a clockwise rotation about the second axis of rotation with the spring element opposing such movement of the first rocker lever, first engagement member and the fixture mechanism, and in a counterclockwise rotation of the fixture mechanism about the second axis of rotation, the engagement of the second engagement member with the first arm of the second rocker lever causes the second rocker lever to rotate in a counterclockwise rotation about the second axis of rotation with the spring element opposing such movement of the second rocker lever, second engagement member and the fixture mechanism;
the first spring mechanism thereby causing the second center axis of the fixture mechanism to remain substantially orthogonal to the first axis of rotation when the fixture mechanism is not subject to an action of external forces.

14. A device as in claim 13, further comprising a spring mechanism opposing the angular movement of the tilting element about the first axis of rotation.

15. A device as in claim 13, and further comprising two separate cylindrically shaped pivots positioned on opposite sides of the fixed portion on a common axis and engaging corresponding sides of the tilting element to form the first axis of rotation.

16. A device as in claim 13, and further comprising two separate cylindrically shaped pivots positioned on opposite sides of the tilting element on a common axis and engaging corresponding sides of the fixture mechanism to form the second axis of rotation.

17. A device as in claim 13, wherein the first and second engagement members are opposite sides of a single plate.

18. A support device for securing workpieces, capable of movement vertically in a predetermined direction and adaptable thus to a shape of a workpiece, comprising:
a rod having a first center axis extending parallel to the predetermined direction;
a head attached to a to end of the rod and incorporating a fixture mechanism serving to anchor the workpiece;
said fixture mechanism having a second center axis and being capable of angular movement relative to the rod about first and second axes of rotation, during which one of the first and second axes of rotation remains orthogonal to the first center axis of the rod and the remaining of the first and second axes of rotation remains orthogonal to the second center axis of the fixture mechanism;
the head further comprising a fixed portion attached to the rod and positionally fixed with respect to the rod, and a tilting element interposed between the fixed portion of the head and the fixture mechanism, the tilting element being mounted pivotably to the fixed portion of the head for angular movement about the first axis of rotation, the fixture mechanism being mounted pivotably to the tilting element for angular movement about the second axis of rotation; each of the tilting element and the fixture mechanism angularly movable to adjust an orientation of the fixture mechanism to correspond to a facing portion of the workpiece,
the support device comprising an immobilizing mechanism for immobilizing the fixture mechanism relative to the first and second axes of rotation, said immobilizing mechanism comprising a restraining element carried by the fixed portion of the head and capable of movement at least between a first position of engagement with a spherically contoured portion of the fixture mechanism, in which the fixture mechanism is locked fast, and a second position of disengagement in which the fixture mechanism is free to pivot about the axes of rotation,
and further comprising two separate cylindrically shaped pivots positioned on opposite sides of the fixed portion on a common axis and engaging corresponding sides of the tilting element to form the first axis of rotation.

19. A device as in claim 18, comprising an actuating mechanism for shifting the restraining element between the first position and the second position and for maintaining the restraining element in the second position of disengagement.

20. A device as in claim 19, wherein the actuating mechanism is pneumatic in operation.

21. A device as in claim 20, comprising a spring mechanism opposing the action of the actuating mechanism, for directing the restraining element forcibly against the spherically contoured portion when occupying the first position, and when the actuating mechanism is not in operation.

22. A support device for securing workpieces, capable of movement vertically in a predetermined direction and adaptable thus to a shape of a workpiece, comprising:
- a rod having a first center axis extending parallel to the predetermined direction;
- a head attached to a top end of the rod and incorporating a fixture mechanism serving to anchor the workpiece;
- said fixture mechanism having a second center axis and being capable of angular movement relative to the rod about first and second axes of rotation, during which one of the first and second axes of rotation remains orthogonal to the first center axis of the rod and the remaining of the first and second axes of rotation remains orthogonal to the second center axis of the fixture mechanism;
- the head further comprising a fixed portion attached to the rod and positionally fixed with respect to the rod, and a tilting element interposed between the fixed portion of the head and the fixture mechanism, the tilting element being mounted pivotally to the fixed portion of the head for angular movement about the first axis of rotation, the fixture mechanism being mounted pivotally to the tilting element for angular movement about the second axis of rotation; each of the tilting element and the fixture mechanism angularly movable to adjust an orientation of the fixture mechanism to correspond to a facing portion of the workpiece,
- the support device comprising an immobilizing mechanism for immobilizing the fixture mechanism relative to the first and second axes of rotation, said immobilizing mechanism comprising a restraining element carried by the fixed portion of the head and capable of movement at least between a first position of engagement with a spherically contoured portion of the fixture mechanism, in which the fixture mechanism is locked fast, and a second position of disengagement in which the fixture mechanism is free to pivot about the axes of rotation,
- and further comprising two separate cylindrically shaped pivots positioned on opposite sides of the tilting element on a common axis and engaging corresponding sides of the fixture mechanism to form the second axis of rotation.

23. A device as in claim 22, comprising an actuating mechanism for shifting the restraining element between the first position and the second position and for maintaining the restraining element in the second position of disengagement.

24. A device as in claim 23, wherein the actuating mechanism is pneumatic in operation.

25. A device as in claim 24, comprising a spring mechanism opposing the action of the actuating mechanism, for directing the restraining element forcibly against the spherically contoured portion when occupying the first position, and when the actuating mechanism is not in operation.

\* \* \* \* \*